United States Patent
Honda et al.

(10) Patent No.: US 8,226,394 B2
(45) Date of Patent: Jul. 24, 2012

(54) OPTICAL MOLDING APPARATUS AND OPTICAL MOLDING METHOD

(75) Inventors: Katsuhisa Honda, Kanagawa (JP);
Nobuhiro Kihara, Kanagawa (JP);
Junichi Kuzusako, Saitama (JP)

(73) Assignee: Sony Corporation, Tokyo (JP)

(*) Notice: Subject to any disclaimer, the term of this patent is extended or adjusted under 35 U.S.C. 154(b) by 129 days.

(21) Appl. No.: 12/354,396

(22) Filed: Jan. 15, 2009

(65) Prior Publication Data

US 2009/0184444 A1    Jul. 23, 2009

(30) Foreign Application Priority Data

Jan. 21, 2008    (JP) ................................. 2008-010082

(51) Int. Cl.
*B29C 35/08* (2006.01)

(52) U.S. Cl. .......... 425/174.4; 425/174.2; 425/447; 425/470; 425/375

(58) Field of Classification Search .......... 425/174.2, 425/174.4, 447, 470, 375
See application file for complete search history.

(56) References Cited

U.S. PATENT DOCUMENTS

| | | | | |
|---|---|---|---|---|
| 5,009,585 A | * | 4/1991 | Hirano et al. | 425/174.4 |
| 5,143,663 A | * | 9/1992 | Leyden et al. | 264/401 |
| 5,609,814 A | * | 3/1997 | Takano | 264/401 |
| 5,688,464 A | * | 11/1997 | Jacobs et al. | 264/401 |
| 6,841,116 B2 | * | 1/2005 | Schmidt | 264/401 |
| 2002/0105114 A1 | * | 8/2002 | Kubo et al. | 264/497 |
| 2005/0093208 A1 | * | 5/2005 | Boyd et al. | 264/442 |
| 2007/0228618 A1 | * | 10/2007 | Kaszuba et al. | 264/494 |
| 2008/0169587 A1 | * | 7/2008 | Kihara et al. | 264/408 |

FOREIGN PATENT DOCUMENTS

| | | |
|---|---|---|
| JP | 2007-076090 | 3/2007 |
| JP | 2007-291393 | 11/2007 |

* cited by examiner

*Primary Examiner* — Christina Johnson
*Assistant Examiner* — Saeed Huda
(74) *Attorney, Agent, or Firm* — SNR Denton US LLP

(57) ABSTRACT

An optical molding apparatus molds a three-dimensional model by stacking cured layers. Each cured layer is formed by emitting light according to cross-sectional-shape data of the three-dimensional model onto a surface of photo-curable resin. The optical molding apparatus includes a container that contains the photo-curable resin, a movable stage that is movable in a direction orthogonal to the surface of the photo-curable resin, an optical system that emits the light onto the surface of the photo-curable resin contained in the container so as to form each cured layer on the movable stage, and a discharging mechanism that performs a discharging operation for discharging new photo-curable resin onto a surface of each cured layer formed on the movable stage before stacking a subsequent cured layer.

12 Claims, 8 Drawing Sheets

OPTICAL MOLDING APPARATUS AND OPTICAL MOLDING METHOD

CROSS REFERENCES TO RELATED APPLICATIONS

The present invention contains subject matter related to Japanese Patent Application JP 2008-010082 filed in the Japanese Patent Office on Jan. 21, 2008, the entire contents of which are incorporated herein by reference.

BACKGROUND OF THE INVENTION

1. Field of the Invention

The present invention relates to optical molding apparatuses and optical molding methods, and particularly, to an optical molding apparatus and an optical molding method that can mold a higher-precision three-dimensional model.

2. Description of the Related Art

An optical molding apparatus optically molds a three-dimensional model by stacking cured layers one of top of the other. Specifically, each of these cured layers is formed by emitting light according to one of cross-sectional-shape data items that corresponds to that cured layer onto a surface of photo-curable resin. These cross-sectional-shape data items are obtained by cross-sectionally slicing the three-dimensional model into three-dimensional segments with a predetermined thickness in the stacking direction.

In optical molding, the presence of small uncured or semi-cured photo-curable resin (to be described later in detail) in the order of micrometers, which is within a permissible error range in related art, becomes non-negligible as the three-dimensional model becomes more detailed.

In order to improve the precision of a three-dimensional model, Japanese Unexamined Patent Application Publication Nos. 2007-291393 and 2007-76090, for example, suggest removal of uncured photo-curable resin remaining on the surface of a molded three-dimensional model. The term "uncured photo-curable resin" refers to photo-curable resin having undergone exposure, which is not semi-cured but may possibly become semi-cured.

SUMMARY OF THE INVENTION

However, uncured or semi-cured photo-curable resin is created every time one cured layer is formed. For this reason, when a cured layer is stacked on the previous cured layer having uncured or semi-cured photo-curable resin remaining thereon, it is difficult to sufficiently improve the precision of the three-dimensional model.

It is therefore desirable to achieve the capability to mold higher-precision three-dimensional models.

According to an embodiment of the present invention, there is provided an optical molding apparatus that molds a three-dimensional model by stacking cured layers. Each cured layer is formed by emitting light according to cross-sectional-shape data of the three-dimensional model onto a surface of photo-curable resin. The optical molding apparatus includes a container that contains the photo-curable resin, a movable stage that is movable in a direction orthogonal to the surface of the photo-curable resin, an optical system that emits the light onto the surface of the photo-curable resin contained in the container so as to form each cured layer on the movable stage, and a discharging mechanism that performs a discharging operation for discharging new photo-curable resin onto a surface of each cured layer formed on the movable stage before stacking a subsequent cured layer.

The optical molding apparatus according to the aforementioned embodiment of the present invention may further include a vibrating mechanism that ultrasonically vibrates the movable stage during the discharging operation performed by the discharging mechanism.

The optical molding apparatus according to the aforementioned embodiment of the present invention may further include a temperature adjusting mechanism that increases or decreases a temperature at an end of the container during the discharging operation performed by the discharging mechanism so as to create a convection current in the photo-curable resin contained in the container.

The optical molding apparatus according to the aforementioned embodiment of the present invention may further include a renewing mechanism that renews the photo-curable resin contained in the container before stacking the subsequent cured layer.

According to another embodiment of the present invention, there is provided an optical molding method performed by an optical molding apparatus that molds a three-dimensional model by stacking cured layers. Each cured layer is formed by emitting light according to cross-sectional-shape data of the three-dimensional model onto a surface of photo-curable resin. The optical molding method includes the steps of emitting the light onto the surface of the photo-curable resin contained in a container so as to form each cured layer on a movable stage that is movable in a direction orthogonal to the surface of the photo-curable resin, and discharging new photo-curable resin onto a surface of each cured layer formed on the movable stage before stacking a subsequent cured layer.

The optical molding method according to the aforementioned embodiment of the present invention may further include the step of ultrasonically vibrating the movable stage while the new photo-curable resin is discharged.

The optical molding method according to the aforementioned embodiment of the present invention may further include the step of increasing or decreasing a temperature at an end of the container while the new photo-curable resin is discharged so as to create a convection current in the photo-curable resin contained in the container.

The optical molding method according to the aforementioned embodiment of the present invention may further include the step of renewing the photo-curable resin contained in the container before stacking the subsequent cured layer.

According to the above embodiments of the present invention, each cured layer is formed on the movable stage, which is movable in the direction orthogonal to the surface of the photo-curable resin contained in the container, by emitting light onto the surface of the photo-curable resin. Moreover, new photo-curable resin is discharged onto the surface of each cured layer formed on the movable stage before stacking a subsequent cured layer.

Accordingly, the above embodiments of the present invention can achieve the capability to mold higher-precision three-dimensional models.

DESCRIPTION OF THE PREFERRED EMBODIMENTS

Figure 1:
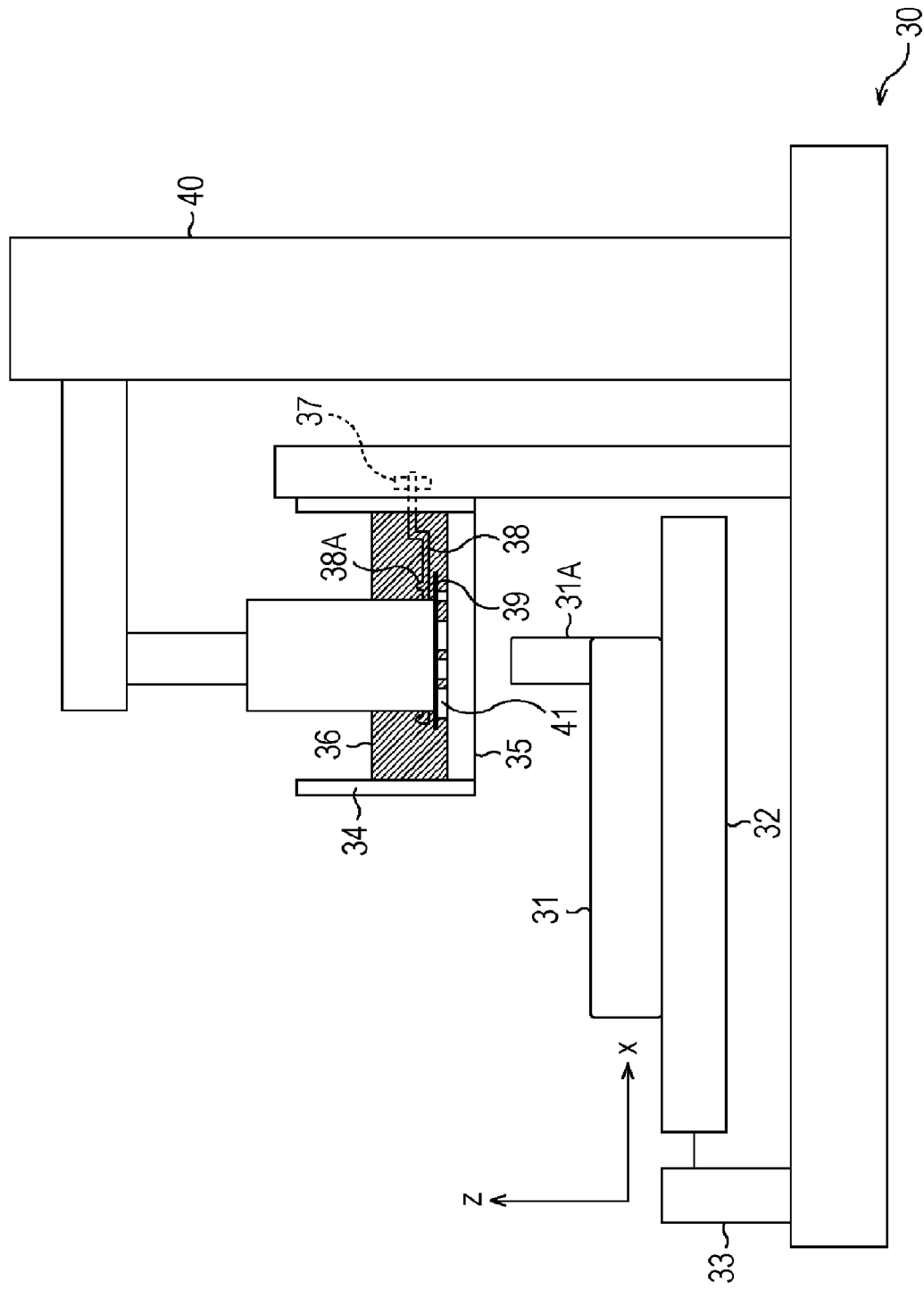
FIG. 1 is an external view of an optical molding apparatus according to an embodiment of the present invention.

FIG. 1 is a schematic external view of an optical molding apparatus 30 according to an embodiment of the present invention.

The optical molding apparatus 30 in FIG. 1 includes an optical system 31 having an objective lens 31A, an XY stage 32, a driving unit 33, a container 34, a glass window 35, ultraviolet curable resin 36 such as liquid resin, a valve 37, a nozzle 38, a YZ stage 39, and a driving unit 40.

The optical molding apparatus 30 performs optical molding based on a restrained liquid-surface technique. Specifically, in this technique, the optical molding apparatus 30 uses the glass window 35 to restrain the liquid surface of the ultraviolet curable resin 36 contained in the container 34 and emits ultraviolet light to the ultraviolet curable resin 36 through the glass window 35 in accordance with cross-sectional-shape data. The term "liquid surface" of the ultraviolet curable resin 36 in this case refers to a surface of the ultraviolet curable resin 36 to which ultraviolet light is to be emitted.

In the optical molding apparatus 30, the optical system 31 is disposed on the XY stage 32 and has the objective lens 31A through which the ultraviolet light is emitted to the ultraviolet curable resin 36. The optical system 31 performs exposure on predetermined rectangular areas (referred to as "small exposure areas" hereinafter) on the liquid surface of the ultraviolet curable resin 36 on an area-by-area basis by emitting ultraviolet light according to cross-sectional-shape data onto each small exposure area on the liquid surface through the objective lens 31A and the glass window 35. Specifically, these small exposure areas constitute an area of the liquid surface that is to define a shape according to the cross-sectional-shape data.

The XY stage 32 can be moved in an x-axis direction and a y-axis direction by the driving unit 33. The x-axis direction and the y-axis direction are parallel to the liquid surface of the ultraviolet curable resin 36, and are orthogonal to each other.

Under the control of a control device 120 (FIG. 5) to be described later, the driving unit 33 sequentially moves the XY stage 32 by a predetermined distance in the x-axis direction so as to perform scanning on each of the small exposure areas in the x-axis direction. Subsequently, under the control of the control device 120, the driving unit 33 moves the XY stage 32 by predetermined distances in the x-axis direction and the y-axis direction, thus shifting the small exposure areas to a starting point of next one of scan lines arranged in the y-axis direction. Then, under the control of the control device 120, the driving unit 33 performs scanning again on each of the small exposure areas in the x-axis direction.

In this manner, the scan lines are sequentially scanned so that a work area constituted by a predetermined number of small exposure areas arranged in the x-axis direction and the y-axis direction is exposed to light in accordance with the cross-sectional-shape data. In consequence, the exposure is performed on the area of the ultraviolet curable resin 36 that defines the shape corresponding to one layer's worth of cross-sectional-shape data, thereby forming one cured layer 41 between the glass window 35 and the YZ stage 39.

Accordingly, the optical molding apparatus 30 is configured to perform exposure on the work area by having the small exposure areas arranged in a matrix, like tiles, in the x-axis direction and the y-axis direction. Therefore, in order to differentiate the optical molding method of the optical molding apparatus 30 from a beam-scanning method or a one-shot exposure method of the related art, in which the small exposure areas and the work area are the same, the optical molding method of the optical molding apparatus 30 will be referred to as a "tiling method".

The container 34 is disposed above the objective lens 31A. The bottom of the container 34 is provided with the glass window 35. The container 34 contains the ultraviolet curable resin 36. In FIG. 1, the inside of the container 34 is shown in a see-through state for the sake of convenience.

The valve 37 is connected to the nozzle 38 having a plurality of holes 38A, and controls the supply of ultraviolet curable resin 36 to the nozzle 38 under the control of the control device 120. The nozzle 38 discharges new, externally-supplied ultraviolet curable resin 36 from the holes 38A. Consequently, when the cured layer 41 formed on the YZ stage 39 is disposed above the nozzle 38, the ultraviolet curable resin 36 near the surface of the cured layer 41 is circulated by newly discharged ultraviolet curable resin 36, thereby removing uncured or semi-cured ultraviolet curable resin 36 (referred to as "residual resin" hereinafter) adhered to the surface of the cured layer 41.

The YZ stage 39 is immersed in the ultraviolet curable resin 36 contained in the container 34 and is movable in the y-axis direction and a z-axis direction under the control of the driving unit 40. The z-axis direction is orthogonal to the liquid surface of the ultraviolet curable resin 36.

Every time an exposure process corresponding to one layer's worth of cross-sectional-shape data is completed, the driving unit 40 moves the YZ stage 39 in the z-axis direction under the control of the control device 120 so as to separate the cured layer 41 formed between the glass window 35 and the YZ stage 39 from the glass window 35.

The driving unit 40 then moves the YZ stage 39 in the y-axis direction and the z-axis direction so as to dispose the cured layer 41 formed on the YZ stage 39 to a position above the nozzle 38. As a result, the residual resin is removed from the surface of the cured layer 41.

Subsequently, under the control of the control device 120, the driving unit 40 returns the YZ stage 39 to the original position in the y-axis direction and then moves the YZ stage 39 in the z-axis direction until the distance between the glass window 35 and the cured layer 41 is equivalent to the thickness of one cured layer. Accordingly, a new cured layer can be stacked on the cured layer 41 from which the residual resin is removed. As a result, a high-precision three-dimensional model can be molded.

Furthermore, while the nozzle 38 discharges ultraviolet curable resin 36 therefrom, the driving unit 40 ultrasonically vibrates the YZ stage 39 for a predetermined period of time under the control of the control device 120. This can facilitate the removal of residual resin by the nozzle 38.

The removal of residual resin performed in the optical molding apparatus 30 in FIG. 1 will be described below with reference to FIGS. 2 and 3.

Figure 2:
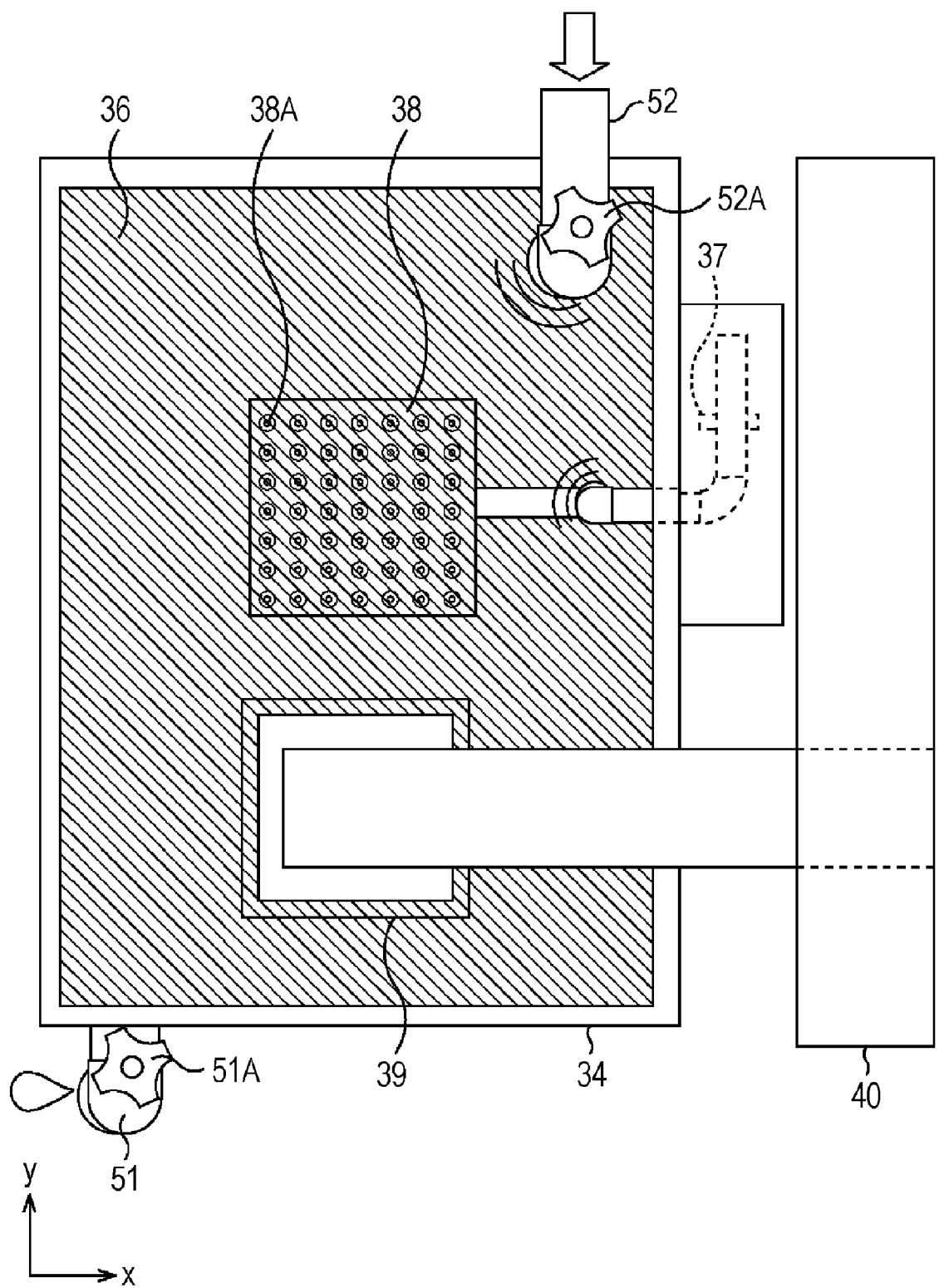
FIG. 2 illustrates a container and its surroundings, as viewed from above in FIG. 1.
Figure 3A:
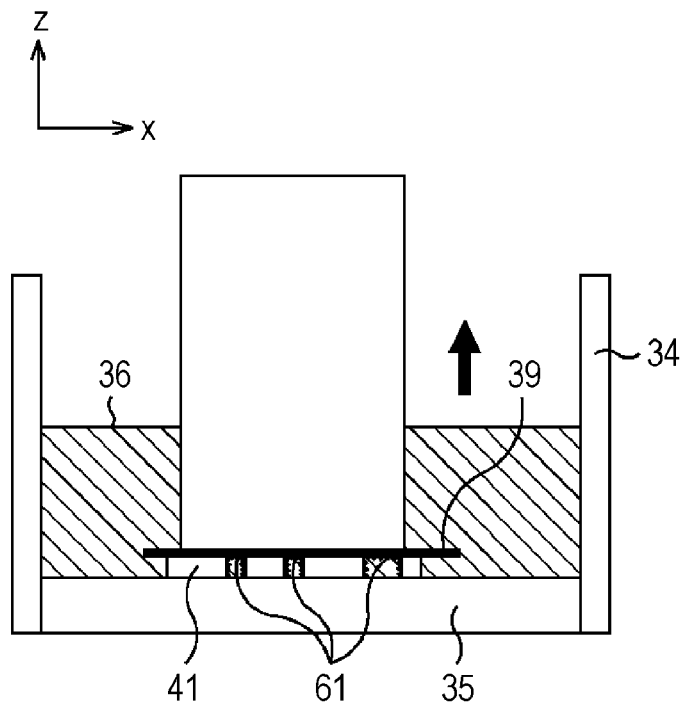
FIGS. 3A and 3B illustrate the container and its surroundings, as viewed from the front in FIG. 1.
Figure 3B:
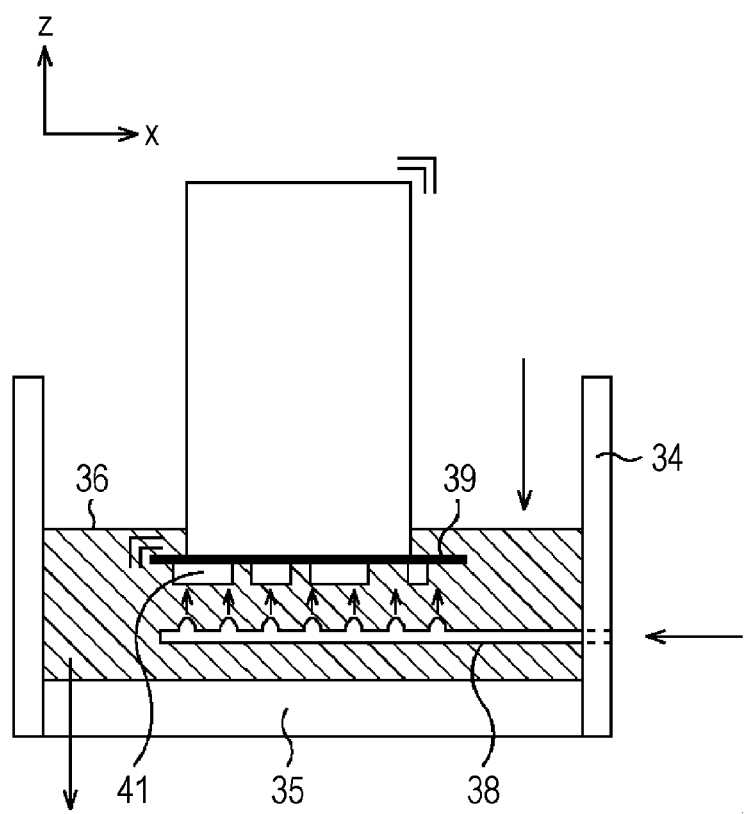

FIG. 2 illustrates the container 34 and its surroundings, as viewed from above in FIG. 1. FIGS. 3A and 3B schematically illustrate the container 34 and its surroundings, as viewed from the front in FIG. 1.

Referring to FIG. 2, when the cured layer 41 is to be formed, the YZ stage 39 is disposed at a predetermined position lower than that of the nozzle 38 having the plurality of holes 38A arranged at equally spaced intervals in an x-y plane. The optical system 31 performs exposure on the ultraviolet curable resin 36 so as to form the cured layer 41 between the YZ stage 39 and the glass window 35, as shown in FIG. 3A. In this case, a small amount of ultraviolet light enters regions not subjected to exposure that are located near the regions subjected to exposure corresponding to the cured layer 41, causing residual resin 61 to adhere to recesses in the surface of the cured layer 41, as shown in FIG. 3A. FIG. 3A only shows sections that are relevant to the formation of the cured layer 41.

When one cured layer 41 is formed, the YZ stage 39 moves in the z-axis direction so as to separate the cured layer 41 from the glass window 35. The YZ stage 39 then moves in the y-axis direction and the z-axis direction so that the cured layer 41 formed on the YZ stage 39 is disposed above the nozzle 38, as shown in FIG. 3B. At this time, the valve 37 controls the nozzle 38 such that the nozzle 38 discharges externally-supplied ultraviolet curable resin 36 from the holes 38A, and moreover, the YZ stage 39 ultrasonically vibrates for a predetermined period of time. In consequence, the residual resin 61 is removed from the surface of the cured layer 41. FIG. 3B only shows sections that are relevant to the removal of the residual resin 61.

When the removal of the residual resin 61 is completed, the control device 120 performs control to open a valve 51A of an outlet pipe 51 provided under the container 34, as shown in FIG. 2, thereby ejecting the remaining ultraviolet curable resin 36, which was not used for forming the cured layer 41, in the container 34. Subsequently, the control device 120 performs control to open a valve 52A of an inlet pipe 52 provided above the container 34, as shown in FIG. 2, thereby injecting an amount of ultraviolet curable resin 36 equivalent to one layer into the container 34 for forming a subsequent cured layer.

In this manner, the optical molding apparatus 30 renews the ultraviolet curable resin 36 before stacking a subsequent cured layer. This can prevent the ultraviolet curable resin 36 from becoming semi-cured, which can occur if uncured ultraviolet curable resin 36 existing in regions not subjected to exposure and created during the previous forming process is exposed to ultraviolet light during the current forming process of a cured layer 41.

On the other hand, the YZ stage 39 moves in the y-axis direction to return to the original position, for forming the cured layer 41, in the y-axis direction, and then moves in the z-axis direction until the distance between the glass window 35 and the cured layer 41 is equivalent to one-layer's thickness of a subsequent cured layer to be formed. Subsequently, a new cured layer is formed by the optical system 31 using the newly-injected ultraviolet curable resin 36 and is stacked on the previous cured layer 41. Then, the removal of residual resin and the ejection and injection of ultraviolet curable resin 36 are performed, as described above. By repeating these steps, cured layers without residual resin are stacked one on top of the other, whereby a high-precision three-dimensional model is molded.

Figure 4:
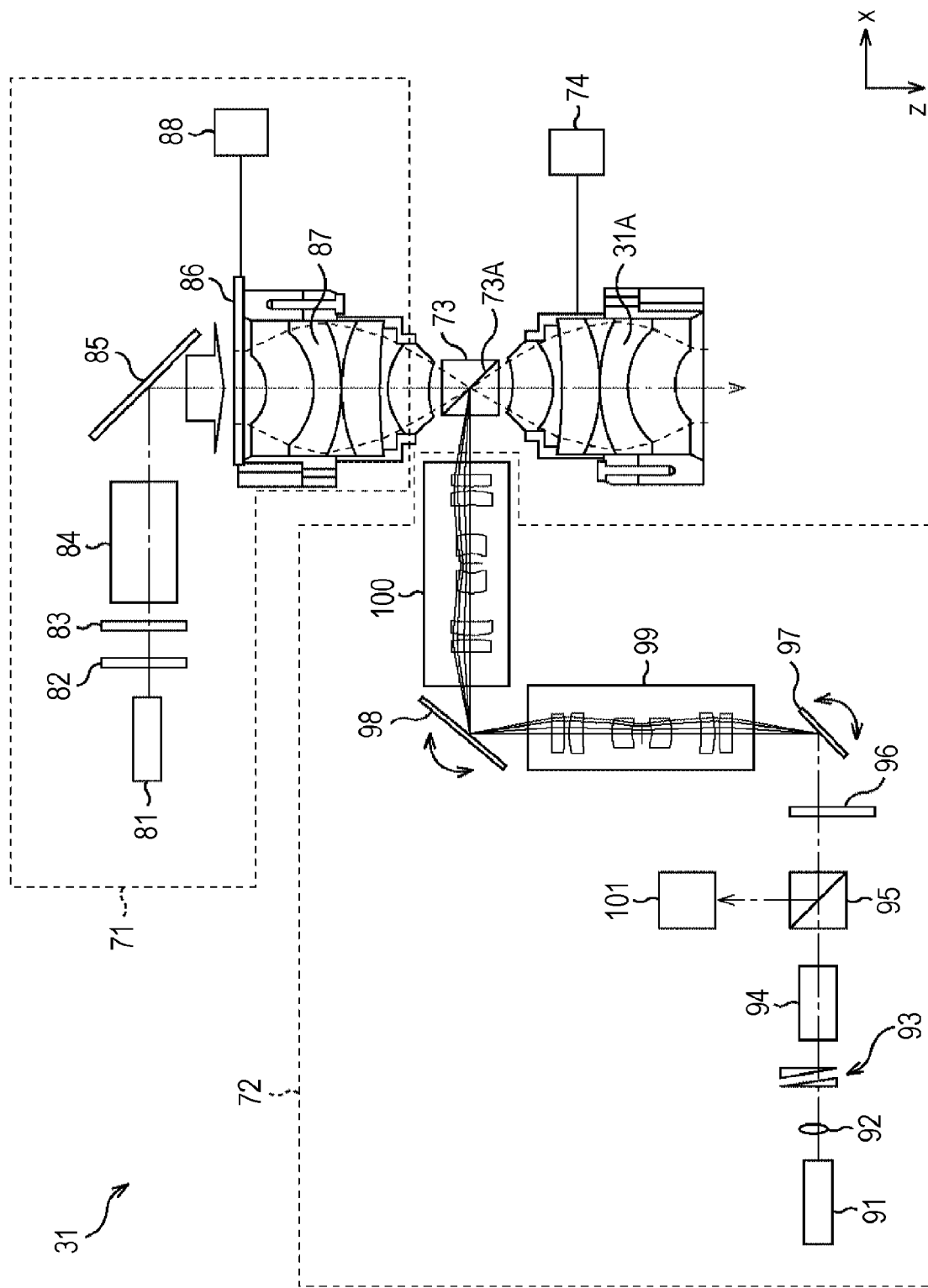
FIG. 4 illustrates a configuration example of an optical system shown in FIG. 1.

FIG. 4 illustrates a configuration example of the optical system 31 shown in FIG. 1.

The optical system 31 in FIG. 4 includes the objective lens 31A, a one-shot exposure optical system 71, a beam-scanning optical system 72, a polarization beam splitter 73, and a driving unit 74.

The one-shot exposure optical system 71 is configured to perform one-shot exposure in which each small exposure area on the liquid surface of the ultraviolet curable resin 36 contained in the container 34 is exposed to light in one shot. The one-shot exposure optical system 71 includes a light source 81, a shutter 82, a polarizing plate 83, a beam integrator 84, a mirror 85, a spatial light modulator 86, a focusing lens 87, and a driving unit 88.

The light source 81 may be of a type that has, for example, high-output blue-light-emitting diodes (LEDs) arranged in an array. Unlike a light source 91 used for beam scanning, to be described later, it is not necessary to use a coherent laser light source as the light source 81. Under the control of the control device 120, the light source 81 emits ultraviolet light to be used for performing the one-shot exposure.

Under the control of the control device 120, the shutter 82 controls the ultraviolet light emitted from the light source 81 by transmitting or blocking the light, and also performs ON/OFF control of the exposure process performed by the one-shot exposure optical system 71.

The polarizing plate 83 polarizes the ultraviolet light passing through the shutter 82 so as to make the light into predetermined polarized light. Specifically, the polarizing plate 83 polarizes the ultraviolet light emitted from the light source 81 so that the spatial light modulator 86 can spatially modulate the light.

The beam integrator 84 uniformizes the ultraviolet light polarized by the polarizing plate 83. The beam integrator 84 may be of a common type, such as a fly's eye type constituted by an array of multiple lens elements or a light rod type configured to cause the light to be completely reflected within a rod lens having a columnar shape, e.g., a rectangular columnar shape.

The mirror 85 reflects the ultraviolet light uniformized by the beam integrator 84 towards the spatial light modulator 86.

The spatial light modulator 86 includes, for example, a transmissive liquid crystal panel and spatially modulates a portion of the ultraviolet light reflected by the mirror 85 so that the ultraviolet light can be projected on the small exposure areas on the liquid surface of the ultraviolet curable resin 36 on an area-by-area basis in accordance with the cross-sectional-shape data.

Specifically, the spatial light modulator 86 receives a driving signal, for controlling each of pixels in the liquid crystal panel, from the control device 120. Based on the driving signal, the spatial light modulator 86 changes the alignment of liquid crystal molecules in the individual pixels in correspondence to an image of the shape according to the cross-sectional-shape data to be projected onto each of the small exposure areas, so as to change the polarization direction of the transmitted light, whereby the ultraviolet light passing through the spatial light modulator 86 is spatially modulated.

In consequence, the emission of ultraviolet light to each small exposure area on the liquid surface of the ultraviolet curable resin 36 is turned on and off for individual rectangular areas (referred to as "exposure unit areas" hereinafter) in that small exposure area in correspondence to the shape set on a small-exposure-area by small-exposure-area basis according to the cross-sectional-shape data. In this case, each exposure unit area corresponds to one pixel of the liquid crystal panel. The ultraviolet light is emitted collectively to the exposure unit areas, which are subjected to receive the ultraviolet light, in each small exposure area. Accordingly, each small exposure area on the liquid surface of the ultraviolet curable resin 36 is exposed to the ultraviolet light having the shape set on a small-exposure-area by small-exposure-area basis according to the cross-sectional-shape data.

Furthermore, as an alternative to the transmissive liquid crystal panel, the spatial light modulator 86 may include a digital micromirror device (DMD) having an array of reflective micromirrors, whose tilt angle is variable in accordance with an input signal, or a reflective liquid-crystal-on-silicon (LCOS) device.

The focusing lens 87 is disposed between the spatial light modulator 86 and the polarization beam splitter 73. Together with the objective lens 31A, the focusing lens 87 functions as a projection optical system for forming an image of the ultraviolet light, spatially modulated by the spatial light modulator 86, on the ultraviolet curable resin 36.

The focusing lens 87 includes a lens group for correcting distortion that may occur when the ultraviolet light spatially modulated by the spatial light modulator 86 passes through the objective lens 31A. Therefore, in addition to functioning as a projection optical system, the focusing lens 87 also has a function for reducing distortion.

For example, the lens group of the focusing lens 87 and a lens group of the objective lens 31A are arranged such that the focusing lens 87 and the objective lens 31A are symmetrical optical systems. With this symmetrical configuration, the ultraviolet light spatially modulated by the spatial light modulator 86 can be focused on an anterior focal point of the objective lens 31A located on a reflective-transmissive surface 73A of the polarization beam splitter 73, thereby reducing distortion.

Under the control of the control device 120 based on feedback light detected by a reflective-light monitor unit 101 of the beam-scanning optical system 72, to be described later, the driving unit 88 drives the spatial light modulator 86 in the z-axis direction, i.e., optical-axis direction, so as to adjust the focus of the ultraviolet light emitted from the one-shot exposure optical system 71 towards the liquid surface of the ultraviolet curable resin 36.

The beam-scanning optical system 72 is configured to perform beam-scanning exposure by scanning a laser beam over each small exposure area on the liquid surface of the ultraviolet curable resin 36 contained in the container 34. The beam-scanning optical system 72 includes a light source 91, a collimator lens 92, an anamorphic lens 93, a beam expander 94, a beam splitter 95, a shutter 96, galvano mirrors 97 and 98, relay lenses 99 and 100, and the aforementioned reflective-light monitor unit 101.

The light source 91 includes, for example, a semiconductor laser that emits an ultraviolet laser light beam having a relatively short wavelength between about the blue region and the ultraviolet region. Under the control of the control device 120, the light source 91 emits an ultraviolet laser light beam to be used by the beam-scanning optical system 72 for beam scanning. The light source 91 may be a gas laser as an alternative to the semiconductor laser.

The collimator lens 92 converts the angle of divergence of the light beam emitted from the light source 91 so as to substantially collimate the light beam. The anamorphic lens 93 shapes the elliptical light beam substantially collimated by the collimator lens 92 so as to give the light beam a substantially circular shape.

The beam expander 94 has a plurality of lenses and adjusts the beam diameter of the light beam, given the substantially circular shape by the anamorphic lens 93, by converting the beam diameter to a desired beam diameter suitable for, for example, the aperture and the numerical aperture of the objective lens 31A.

The beam splitter 95 transmits the light beam emitted from the light source 91 and causes the light beam to travel towards the ultraviolet curable resin 36 contained in the container 34. In addition, feedback light reflected by the ultraviolet curable resin 36 and then passing through the individual optical systems is reflected towards the reflective-light monitor unit 101 by the beam splitter 95.

Under the control of the control device 120, the shutter 96 controls the light beam transmitted through the beam splitter 95 by transmitting or blocking the light beam so as to perform ON/OFF control of the beam-scanning exposure performed by the beam-scanning optical system 72. Instead of performing the ON/OFF control of the beam-scanning exposure by transmitting or blocking the light beam using the shutter 96, the ON/OFF control of the beam-scanning exposure may be performed by controlling direct modulation of the emission of the light beam in the light source 91.

The galvano mirrors 97 and 98 each include a reflecting portion (not shown), such as a mirror, which is rotatable in a predetermined direction and an adjusting portion (not shown) that adjusts the angle of the reflecting portion in the rotational direction in accordance with the control performed by the control device 120. The adjusting portion adjusts the angle of the reflecting portion so that the light beam reflected by the reflecting portion can be scanned in the x-axis direction or the y-axis direction within each small exposure area on the liquid surface of the ultraviolet curable resin 36.

Specifically, the galvano mirror 97 reflects the light beam transmitted through the shutter 96 towards the galvano mirror 98 and causes the light beam to be scanned in the x-axis direction within each small exposure area on the liquid surface of the ultraviolet curable resin 36. The galvano mirror 98 reflects the light beam reflected by the galvano mirror 97 towards the polarization beam splitter 73 and causes the light beam to be scanned in the y-axis direction across the liquid surface of the ultraviolet curable resin 36.

Alternatively, the galvano mirrors 97 and 98 in the optical system 31 may be replaced by polygon mirrors.

The relay lenses 99 and 100 each include a lens group having one or more lenses. The relay lens 99 emits a collimated incident light beam in a parallel fashion over a scanning angle by which the light beam is scanned by the galvano mirror 97, and forms an image of the light beam reflected by the galvano mirror 97 on the galvano mirror 98. The relay lens 100 emits a collimated incident light beam in a parallel fashion over a scanning angle by which the light beam is scanned by the galvano mirror 98, and forms an image of the light beam reflected by the galvano mirror 98 on the reflective-transmissive surface 73A of the polarization beam splitter 73.

By providing the relay lens 99 between the galvano mirror 97 and the galvano mirror 98 and providing the relay lens 100 between the galvano mirror 98 and the polarization beam splitter 73 in this manner, an image of the light beam can be formed on the reflective-transmissive surface 73A of the polarization beam splitter 73 even if the light beam is scanned by the galvano mirrors 97 and 98 that are not disposed adjacent to each other.

The reflective-light monitor unit 101 employs, for example, the astigmatic method or the triangulation method to detect the feedback light reflected by the liquid surface of the ultraviolet curable resin 36, and inputs the detected result to the control device 120.

The polarization beam splitter 73 combines the ultraviolet light from the one-shot exposure optical system 71 with the light beam from the beam-scanning optical system 72 and guides the combined light to the ultraviolet curable resin 36. The polarization beam splitter 73 is disposed such that the reflective-transmissive surface 73A thereof coincides with the anterior focal point of the objective lens 31A.

The objective lens 31A includes a lens group having one or more lenses. The objective lens 31A forms an image of the ultraviolet light from the one-shot exposure optical system 71 on the liquid surface of the ultraviolet curable resin 36, and also condenses the light beam from the beam-scanning optical system 72.

Furthermore, the objective lens 31A is configured such that the light beam deflected by the galvano mirrors 97 and 98 in the beam-scanning optical system 72 can be scanned at a uniform rate within each small exposure area on the liquid surface of the ultraviolet curable resin 36, that is, scanned at a uniform scan-line rate on the liquid surface of the ultraviolet curable resin 36.

For example, the objective lens 31A is a so-called fθ lens that has an image height Y proportional to an incident angle θ and that has a relationship (Y=f×θ) in which the image height Y is equal to a product of a focal length f and the incident angle θ. In this case, the scanning rate of the light beam is constantly fixed regardless of the incident position of the light beam on the objective lens 31A. This can prevent the designed shape and the actual shape of a cured layer from being different from each other, which can occur due to variations in the scanning rate, thereby achieving high-precision molding.

Under the control of the control device 120 based on feedback light detected by the reflective-light monitor unit 101 of the beam-scanning optical system 72, the driving unit 74 drives the objective lens 31A in the z-axis direction so as to adjust the focus of the light beam emitted from the beam-scanning optical system 72 towards the liquid surface of the ultraviolet curable resin 36. In detail, the driving unit 74 drives the objective lens 31A in the z-axis direction so that a posterior focal point of the objective lens 31A coincides with the liquid surface of the ultraviolet curable resin 36 contained in the container 34.

Figure 5:
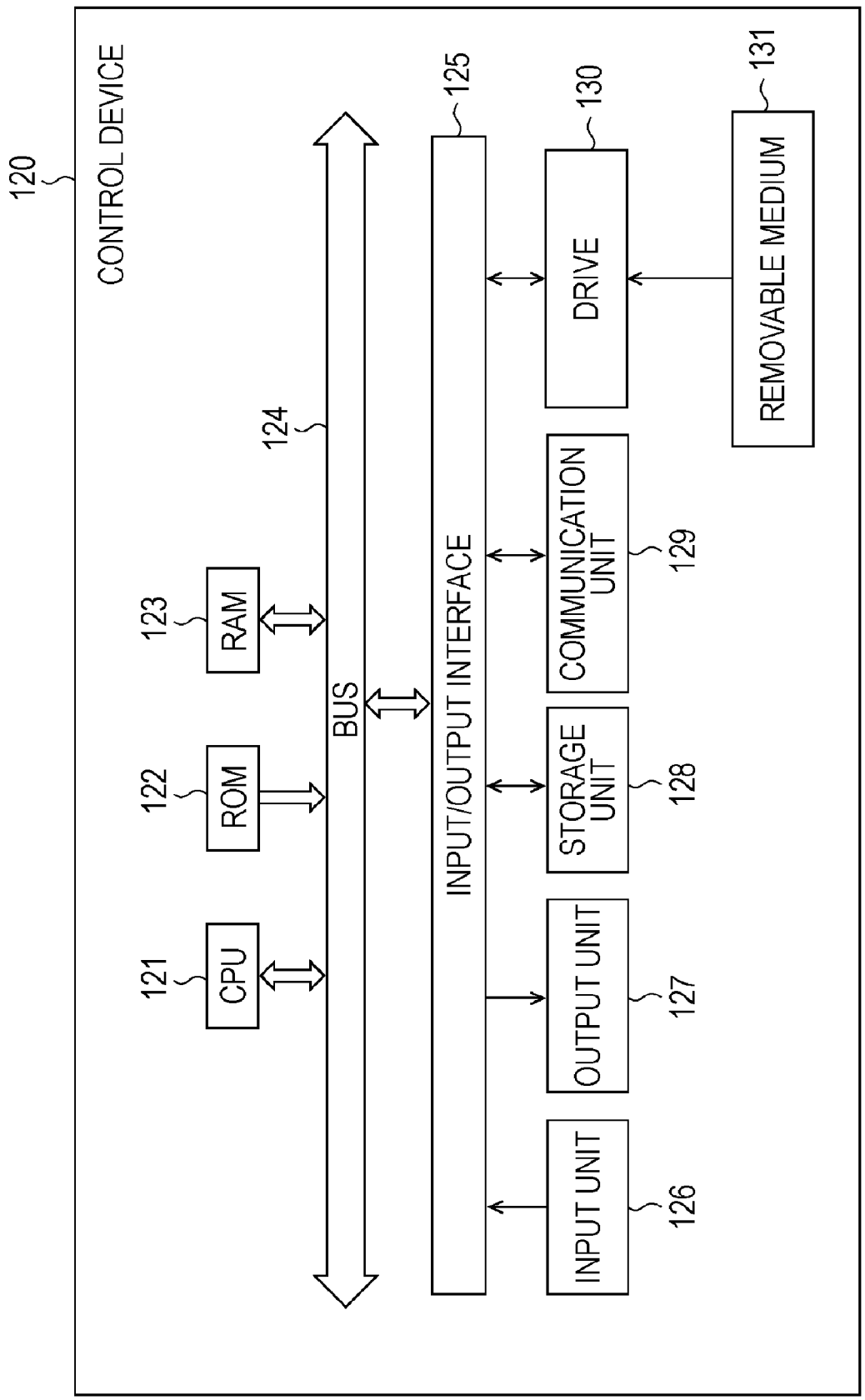
FIG. 5 is a block diagram showing a configuration example of hardware of a control device that controls the individual units in the optical molding apparatus shown in FIG. 1.

FIG. 5 illustrates a configuration example of hardware of the control device 120 that controls the individual units in the optical molding apparatus 30 shown in FIG. 1.

In the control device 120 shown in FIG. 5, a central processing unit (CPU) 121, a read-only memory (ROM) 122, and a random-access memory (RAM) 123 are mutually connected to one another via a bus 124.

The bus 124 is further connected to an input/output interface 125. The input/output interface 125 is connected to an input unit 126 including for example, a keyboard, a mouse, and a microphone, to an output unit 127, including, for example, a display and a speaker, to a storage unit 128 including, for example, a hard disk and a nonvolatile memory, to a communication unit 129 including, for example, a network interface and communicable with the optical molding apparatus 30, and to a drive 130 that drives a removable medium 131, such as a magnetic disc, an optical disc, a magneto-optical disc, or a semiconductor memory.

The storage unit 128 stores, for example, a program for converting three-dimensional-shape data of a three-dimensional model created by computer aided design (CAD) to stereo lithography (STL), which is a format that expresses the surface of the three-dimensional model with small triangular surfaces, a program for creating cross-sectional-shape data of the three-dimensional model from the STL-converted three-dimensional-shape data, and a program for controlling the one-shot exposure optical system 71 and the beam-scanning optical system 72 on the basis of the cross-sectional-shape data of the three-dimensional model.

In the control device 120, the CPU 121 loads, for example, the programs stored in the storage unit 128 into the RAM 123 via the input/output interface 125 and the bus 124 so as to execute the programs, and controls the individual units in the optical molding apparatus 30 via the communication unit 129 so as to cause the optical molding apparatus 30 to perform optical molding.

For example, the CPU 121 in the control device 120 determines the intensity of ultraviolet light to be emitted from the light source 81 or the light source 91 in accordance with an input from the input unit 126, and sends a control signal for controlling the intensity to the light source 81 or the light source 91 via the communication unit 129. In accordance with an input from the input unit 126, the CPU 121 sends a control signal used for performing ON/OFF control of an exposure process to the shutter 82 or the shutter 96 via the communication unit 129.

Furthermore, in accordance with the cross-sectional-shape data, the CPU 121 sends a driving signal for controlling the individual pixels in the liquid crystal panel to the spatial light modulator 86 via the communication unit 129 so that an image of the shape set on a small-exposure-area by small-exposure-area basis according to the cross-sectional-shape data is displayed.

Moreover, based on feedback light received from the reflective-light monitor unit 101 via the communication unit 129, the CPU 121 sends a control signal for driving the spatial light modulator 86 in the z-axis direction to the driving unit 88 via the communication unit 129 and also sends a control signal for driving the objective lens 31A in the z-axis direction to the driving unit 74 via the communication unit 129.

Furthermore, in accordance with the cross-sectional-shape data, the CPU 121 sends a control signal for adjusting the angle of the reflecting portions of the galvano mirrors 97 and 98 to the galvano mirrors 97 and 98 via the communication unit 129 so that an exposure process related to the shape set on a small-exposure-area by small-exposure-area basis according to the cross-sectional-shape data is performed.

Furthermore, the CPU 121 sends a control signal for moving the XY stage 32 in the x-axis direction by a predetermined distance at a predetermined timing to the driving unit 33 via the communication unit 129 so that each of the small exposure areas can be scanned in the x-axis direction. When the scanning of each of the small exposure areas in the x-axis direction is completed, the CPU 121 sends to the driving unit 33 via the communication unit 129 a control signal for shifting the small exposure areas to a starting point for a subsequent scan line.

Every time an exposure process corresponding to one layer's worth of cross-sectional-shape data is completed, the CPU 121 sends a control signal for moving the YZ stage 39 by a predetermined distance in the z-axis direction to the driving unit 40 via the communication unit 129. This separates the cured layer 41 formed between the glass window 35 and the YZ stage 39 from the glass window 35. Subsequently, the CPU 121 sends to the driving unit 40 via the communication unit 129 a control signal for moving the YZ stage 39 with the cured layer formed thereon to a position above the nozzle 38. The CPU 121 then sends to the driving unit 40 via the communication unit 129 a control signal for returning the YZ stage 39 to the original position in the y-axis direction and for moving the YZ stage 39 in the z-axis direction such that the distance between the glass window 35 and the formed cured layer 41 becomes equivalent to the thickness of one cured layer to be formed in the subsequent process.

Furthermore, at a predetermined timing, the CPU 121 sends a control signal for opening the valve 37 to the valve 37 via the communication unit 129 and also sends a control signal for ultrasonically vibrating the YZ stage 39 to the driving unit 40 via the communication unit 129. Moreover, the CPU 121 sends a control signal for opening the valve 51A or 52A shown in FIG. 2 to the valve 51A or 52A via the communication unit 129.

A molding process performed by the CPU 121 in FIG. 5 will now be described with reference to FIG. 6. This molding process starts in response to, for example, an instruction for molding input to the input unit 126 by the user.

In step S11, the CPU 121 selects three-dimensional-shape data of a three-dimensional model, designated by the user in accordance with an input from the input unit 126, as three-dimensional-shape data of a three-dimensional model to be molded. The CPU 121 then creates cross-sectional-shape data from the three-dimensional-shape data.

In step S12, the CPU 121 performs an initial setting process. In detail, for example, the CPU 121 controls the driving units 33 and 40 so as to move the XY stage 32 and the YZ stage 39 to initial positions. Moreover, the CPU 121 sends control signals for controlling the intensities of ultraviolet light and light beam to the light sources 81 and 91, respectively, and measures the intensities of the ultraviolet light and the light beam emitted respectively from the light sources 81 and 91 in correspondence to the control signals. Furthermore, the CPU 121 opens the valve 52A in FIG. 2 for a predetermined period of time so that ultraviolet curable resin 36 necessary for forming one cured layer is injected into the container 34.

In step S13, the CPU 121 controls the driving units 33 and 40 so as to move the XY stage 32 and the YZ stage 39 to preliminarily set starting positions for molding. In step S14, the CPU 121 controls the driving unit 40 so as to slowly move the YZ stage 39 downward in the z-axis direction.

In step S15, the CPU 121 controls the driving unit 40 so as to stop the YZ stage 39 at a position near the top surface of the glass window 35.

In step S16, the CPU 121 controls the driving unit 40 so as to move the YZ stage 39 upward by a distance equivalent to the thickness of one cured layer 41 to be formed first. In step S17, the CPU 121 performs a one-layer molding process for molding one cured layer. This one-layer molding process will be described in detail later with reference to a flow chart in FIG. 7.

In step S18, the CPU 121 controls the driving unit 40 so as to move the YZ stage 39 upward by a predetermined distance in the z-axis direction. In consequence, the cured layer formed between the glass window 35 and the YZ stage 39 is separated from the glass window 35.

In step S19, the CPU 121 controls the driving unit 40 so as to move the YZ stage 39 by a predetermined distance in the y-axis direction and the z-axis direction until the cured layer formed on the YZ stage 39 is disposed above the nozzle 38. In step S20, the CPU 121 controls the valve 37 so as to supply ultraviolet curable resin 36 to the nozzle 38 for a predetermined period of time, thus causing the nozzle 38 to discharge the ultraviolet curable resin 36 therefrom for the predetermined period of time. At the same time, the CPU 121 controls the driving unit 40 so as to ultrasonically vibrate the YZ stage 39 for a predetermined period of time. In consequence, residual resin adhered to the surface of the cured layer is removed from the surface.

In step S21, the CPU 121 controls the valve 51A (FIG. 2) so as to open the valve 51A for a predetermined period of time, whereby the ultraviolet curable resin 36 remaining in the container 34 is ejected outward from the outlet pipe 51.

In step S22, the CPU 121 determines whether to terminate the stacking process, that is, determines whether the process in step S17 is performed for the number of layers corresponding to the three-dimensional-shape data selected in step S11. If it is determined in step S22 that the stacking process is not to be terminated, that is, if a three-dimensional model having the shape corresponding to the three-dimensional-shape data selected in step S11 is not completely molded yet, the CPU 121 controls the valve 52A in step S23 to open the valve 52A for a predetermined period of time so that an amount of ultraviolet curable resin 36 necessary for forming one cured layer is injected into the container 34 through the inlet pipe 52.

In step S24, the CPU 121 controls the driving unit 33 so as to move the XY stage 32 again to the starting position for molding. In step S25, the CPU 121 controls the driving unit 40 so as to move the YZ stage 39 in the z-axis direction until the distance between the top surface of the glass window 35 and the bottom surface of the cured layer formed on the YZ stage 39 is equivalent to the thickness of one cured layer to be formed next. The process then returns to step S17, and the series of steps S17 to S25 is repeated until the CPU 121 determines to terminate the stacking process. Accordingly, cured layers are stacked in this manner.

On the other hand, if the CPU 121 determines to terminate the stacking process in step S22, that is, if the CPU 121 determines that a three-dimensional model having the shape corresponding to the three-dimensional-shape data selected in step S11 is completely molded, the CPU 121 controls the driving units 33 and 40 in step S26 so as to move the XY stage 32 and the YZ stage 39 to the initial positions, thereby ending the process.

The one-layer molding process performed in step S17 in FIG. 6 will now be described with reference to FIG. 7.

In step S41, the CPU 121 controls the individual units so as perform exposure on the small exposure areas on the liquid surface of the ultraviolet curable resin 36 contained in the container 34 on an area-by-area basis by using the ultraviolet light from the one-shot exposure optical system 71 or the light beam from the beam-scanning optical system 72. In step S42, the CPU 121 determines whether step S41 is repeated by a predetermined number of times (e.g. the number of small exposure areas arranged in the x-axis direction within the work area).

If it is determined in step S42 that step S41 is not repeated by the predetermined number of times, the CPU 121 sends a control signal to the driving unit 33 in step S43 so as to move the XY stage 32 in the x-axis direction by a distance equivalent to the length of one small exposure area in the x-axis direction. The process then returns to step S41, and the series of steps S41 to S43 is repeated until step S41 is repeated by the predetermined number of times.

On the other hand, if it is determined in step S42 that step S41 is repeated by the predetermined number of times, that is, if the scanning of each of the small exposure areas in the x-axis direction is completed, the CPU 121 sends a control signal to the driving unit 33 in step S44 so as to move the XY stage 32 to the starting position in the x-axis direction.

In step S45, the CPU 121 sends a control signal to the driving unit 33 so as to move the XY stage 32 in the y-axis direction by a distance equivalent to the length of one small exposure area in the y-axis direction. As the result of steps S44 and S45, the small exposure areas are shifted to a starting position for a subsequent scan line.

In step S46, the CPU 121 controls the individual units so as perform exposure on the small exposure areas on the liquid surface of the ultraviolet curable resin 36 contained in the container 34 on an area-by-area basis.

In step S47, the CPU 121 determines whether step S46 is repeated by a predetermined number of times (e.g. the number of small exposure areas arranged in the y-axis direction within the work area). If it is determined in step S47 that step S46 is not yet repeated by the predetermined number of times, the process proceeds to step S48 where the CPU 121 sends a control signal to the driving unit 33 so as to move the XY stage 32 in the x-axis direction by a distance equivalent to the length of one small exposure area in the x-axis direction. The process then returns to step S41 where exposure is performed on the small exposure areas on an area-by-area basis. Subsequently, the process proceeds to step S42.

At this time, in step S42, it is determined whether step S41 is repeated by a predetermined number of times (e.g. a number obtained by subtracting 1 from the number of small exposure areas arranged in the x-axis direction within the work area), and the series of steps S41 to S43 is repeated until step S41 is repeated by the predetermined number of times. Subsequently, steps S44 to S46 are performed, and the series of steps S41 to S48 is similarly repeated until step S46 is repeated by the predetermined number of times.

Figure 6:
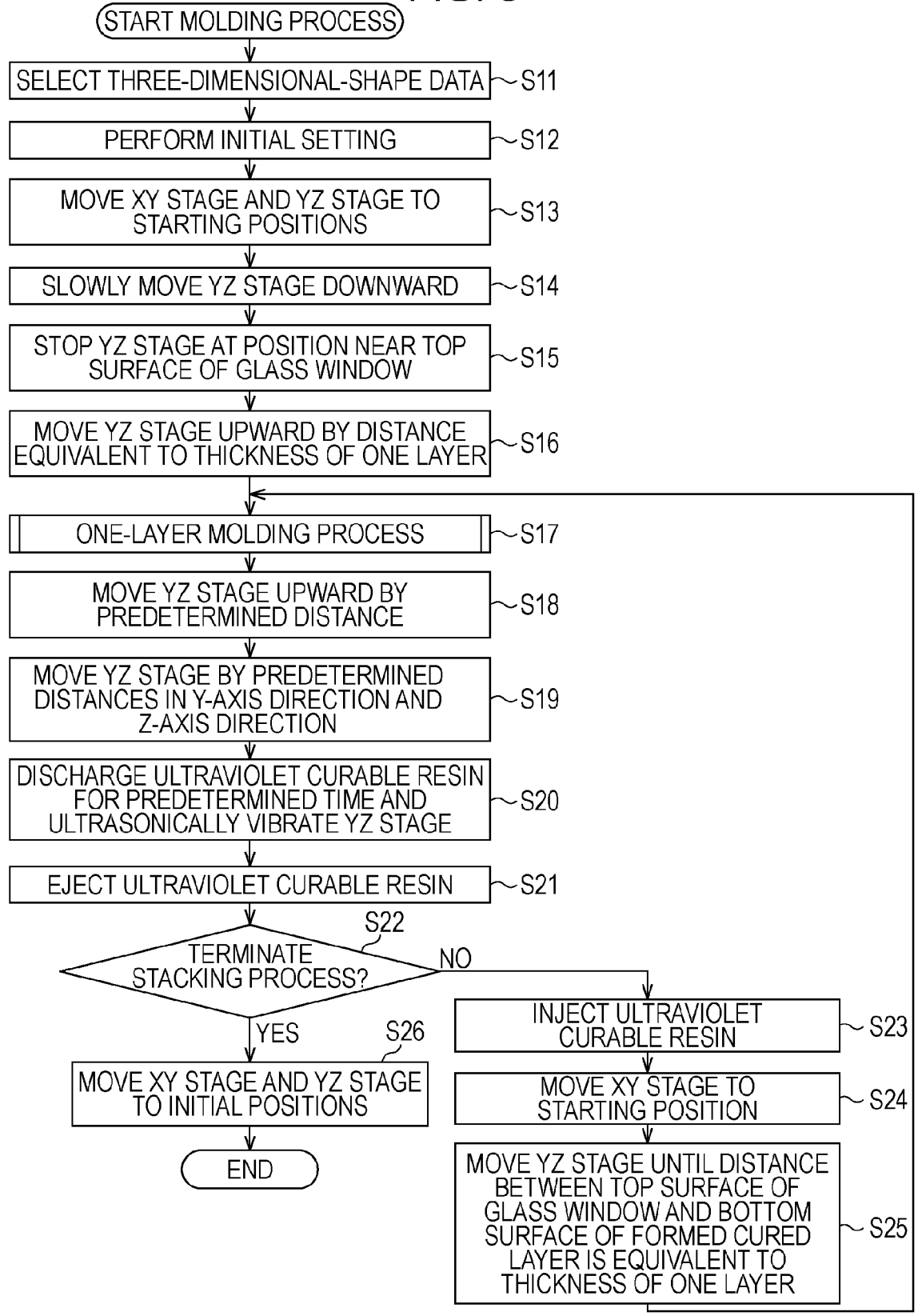
FIG. 6 is a flow chart illustrating a molding process performed by a CPU shown in FIG. 5.
Figure 7:
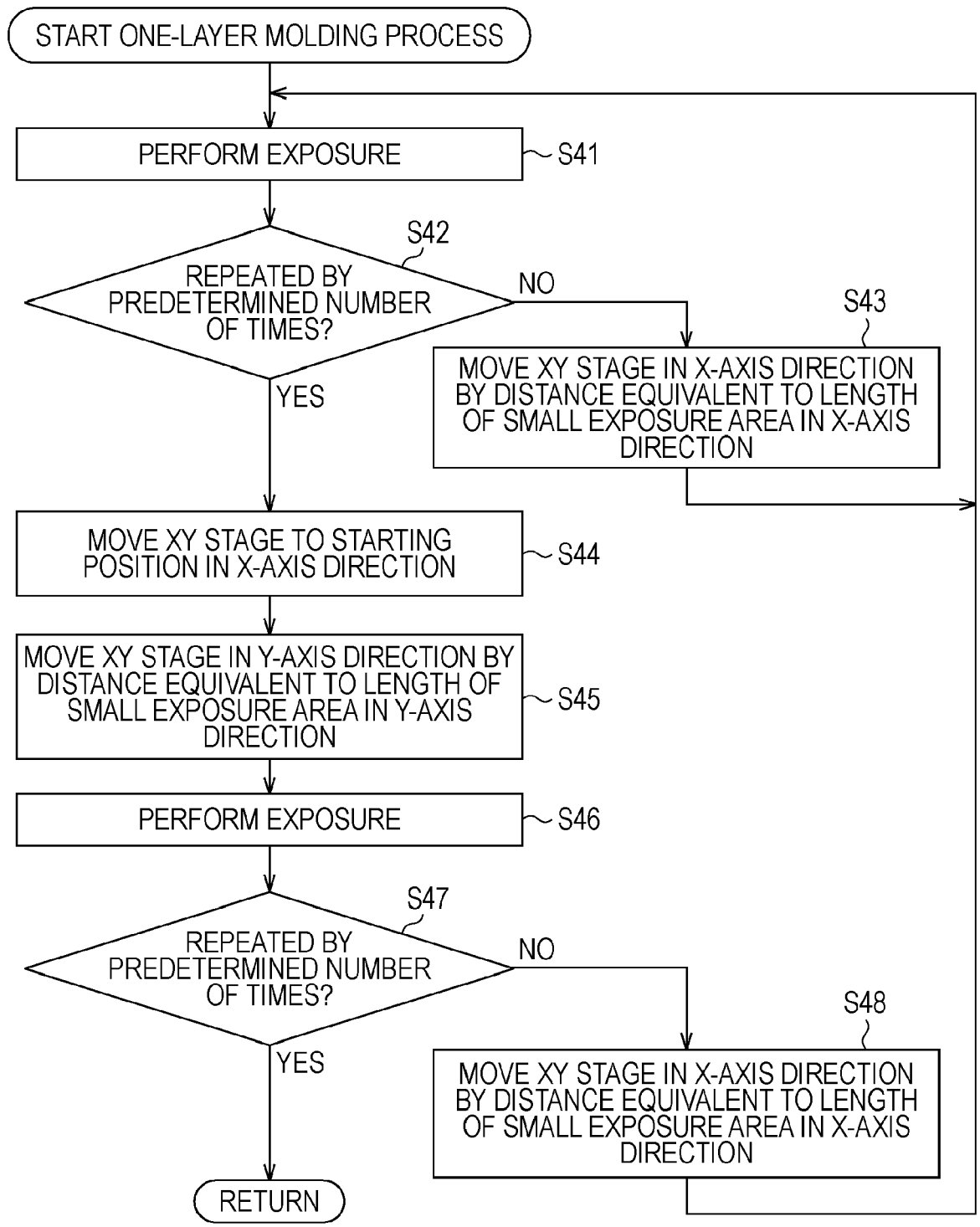
FIG. 7 is a flow chart illustrating a one-layer molding process performed in step S17 in FIG. 6.

On the other hand, if it is determined in step S47 that step S46 is repeated by the predetermined number of times, that is, if exposure is performed on an area defining the shape corresponding to one-layer's worth of cross-sectional-shape data, the process returns to step S17 in FIG. 6.

Accordingly, in the optical molding apparatus 30, residual resin adhered to the surface of a current cured layer formed on the YZ stage 39 is removed before stacking a subsequent cured layer, whereby the subsequent cured layer can be stacked on the current cured layer from which the residual resin is removed. As a result, a high-precision three-dimensional model can be molded.

Figure 8:
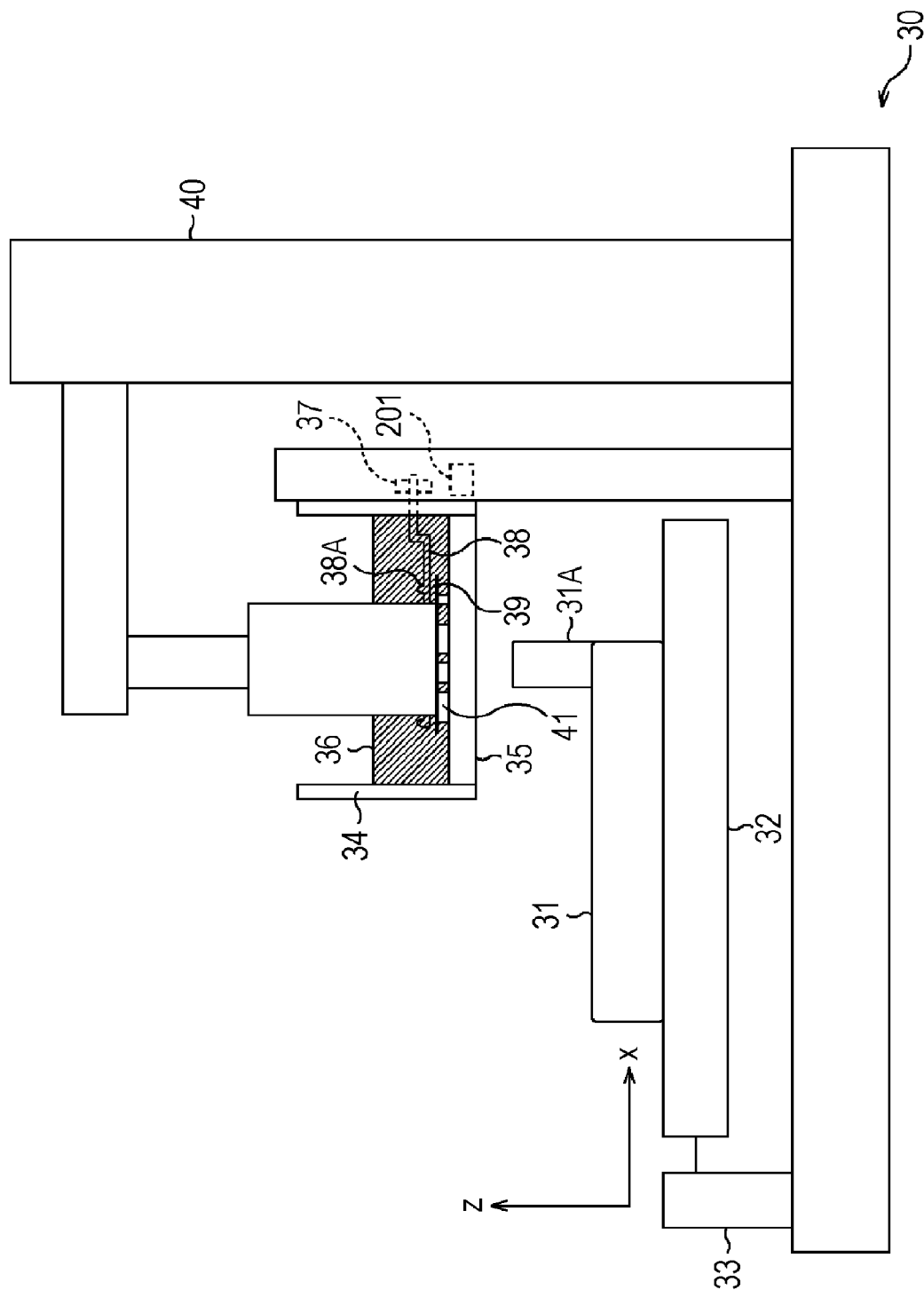
FIG. 8 is an external view of an optical molding apparatus according to another embodiment of the present invention.

Referring to FIG. 8 showing another embodiment of the present invention, the optical molding apparatus 30 may be equipped with a temperature adjusting mechanism 201 configured to increase or decrease the temperature at an end of the container 34. In that case, under the control of the control device 120, the temperature adjusting mechanism 201 increases or decreases the temperature at the end of the container 34 while the nozzle 38 discharges ultraviolet curable resin 36 therefrom. This creates a convection current in the ultraviolet curable resin 36 within the container 34, thereby facilitating the removal of residual resin by the nozzle 38.

Although the nozzle 38 is provided within the container 34 according to the above description, the nozzle 38 may be provided in another container that is independent of the container 34.

Furthermore, the optical molding apparatus 30 may be provided with a driving unit that moves the nozzle 38 within the x-y plane. In that case, the ultraviolet curable resin 36 can be discharged over the entire surface of a cured layer at small intervals even if the nozzle 38 has only a small number of holes 38A or has a small size in the x-y plane. Consequently, the removal of residual resin can be properly performed.

The above embodiments of the present invention have a remarkable effect especially when molding a three-dimensional model having a small size in the order of micrometers.

Furthermore, in addition to the above-described optical molding apparatus that performs optical molding based on a tiling method, another embodiment of the present invention may provide an optical molding apparatus that performs optical molding based on a one-shot exposure method or a beam-scanning method. Furthermore, in addition to the above-described optical molding apparatus that performs optical molding based on a restrained liquid-surface technique, another embodiment of the present invention may provide an optical molding apparatus that performs optical molding based on a free liquid-surface technique.

In this specification, the steps written in the program stored in a program recording medium may be performed in a time-series fashion according to the above-written order, or may be performed in a parallel fashion or in an individual fashion, instead of being performed in the time-series fashion.

The embodiments of the present invention are not limited to the above-described embodiments, and various modifications are permissible to an extent that they do not depart from the scope of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. An optical molding apparatus that molds a three-dimensional model by stacking cured layers, each cured layer being formed by emitting light according to cross-sectional-shape data of the three-dimensional model onto a surface of photo-curable resin, the optical molding apparatus comprising:
    a container that contains the photo-curable resin;
    a glass window at a bottom of the container, the glass window restraining a liquid surface of the photo-curable resin within the container;
    a movable stage that is movable in a first direction orthogonal to a major surface of the photo-curable resin, and second and third directions parallel to the surface of the photo-curable resin;
    an optical system that emits the light onto one or more selected portions of the surface of the photo-curable resin contained in the container through an objective lens disposed below the glass window so as to form each cured layer on the movable stage;
    a discharging mechanism that performs a discharging operation for discharging new photo-curable resin onto a surface of each cured layer formed on the movable stage before stacking a subsequent cured layer;
    a vibrating mechanism that ultrasonically vibrates the movable stage for a predetermined time period during the discharging operation performed by the discharging mechanism;
    a shutter to control the light emitted from the optical system by transmitting or blocking the light;
    a polarizing plate that polarizes the light into polarized light;
    a beam integrator that makes uniform the polarized light into uniformized light; and
    a spatial light modulator that modulates a portion of the uniformized light into spatially modulated light for projection onto the one or more selected portions.

2. The optical molding apparatus according to claim 1, wherein:
    the first direction is a z-axis direction, the second direction is an x-axis direction and the third direction is a y-axis direction, and
    the movable stage is moved in the first and third directions, as needed, in response to completion of light exposure for an entire layer of the three-dimensional model.

3. The optical molding apparatus according to claim 1, further comprising a temperature adjusting mechanism that increases or decreases a temperature at an end of the container during the discharging operation performed by the discharging mechanism so as to create a convection current in the photo-curable resin contained in the container.

4. The optical molding apparatus according to claim 1, further comprising a renewing mechanism that renews the photo-curable resin contained in the container before stacking the subsequent cured layer.

5. The optical molding apparatus according to claim 1, wherein the light is emitted to expose predetermined rectangular areas on a liquid surface of the photo-curable resin.

6. The optical molding apparatus according to claim 1, wherein exposure of the predetermined rectangular areas is performed in a matrix configuration.

7. The optical molding apparatus according to claim 3, wherein the discharging mechanism is a nozzle having a plurality of holes arranged at equally spaced intervals in a plane of the first direction and the second direction, the convection current facilitates removal of residual resin by the nozzle.

8. The optical molding apparatus according to claim 2, wherein the movable stage is movable in the second directions and third directions for positioning the movable stage for emission of the light onto the one or more selected portions of the surface of the photo-curable resin.

9. The optical molding apparatus according to claim 1, wherein:
the photo-curable resin is an ultraviolet curable resin in liquid form, and
the movable stage is immersed in the ultraviolet curable resin.

10. The optical molding apparatus according to claim 4, wherein:
the renewing mechanism includes an outlet valve for removing residual resin from the container and an inlet valve for injecting additional photo-curable resin into the container for forming the subsequent cured layer, and
the photo-curable resin is renewed before stacking each subsequently cured layer.

11. An optical molding apparatus that molds a three-dimensional model by stacking cured layers, each cured layer being formed by emitting light according to cross-sectional-shape data of the three-dimensional model onto a surface of photocurable resin, the optical molding apparatus comprising:

a container that contains the photo-curable resin;
a glass window at a bottom of the container, the glass window restraining a liquid surface of the photo-curable resin within the container;
a movable stage that is movable in a first direction orthogonal to a major surface of the photo-curable resin, and second and third directions parallel to the surface of the photocurable resin;
an optical system to emit the light onto one or more selected portions of the surface of the photo-curable resin contained in the container through an objective lens disposed below the glass window so as to form each cured layer on the movable stage;
a discharging mechanism to perform a discharging operation for discharging new photo-curable resin onto a surface of each cured layer formed on the movable stage before stacking a subsequent cured layer;
a vibrating mechanism to ultrasonically vibrate the movable stage for a predetermined time period during the discharging operation performed by the discharging mechanism;
a shutter to control the light emitted from the optical system by transmitting or blocking the light;
a polarizing plate that polarizes the light into polarized light;
a beam integrator that makes uniform the polarized light into uniformized light;
a spatial light modulator that modulates a portion of the uniformized light into spatially modulated light for projection onto the one or more selected portions; and
a focusing lens disposed between the spatial light modulator and a polarization beam splitter, the focusing lens cooperating with the objective lens to provide a projection optical system, the focusing lens correcting distortions caused by passing the spatially modulated light through the objective lens.

12. The optical molding apparatus according to claim 1, further comprising:
a collimator lens operable to convert an angle of divergence of the light beam emitted from the light source to substantially collimate the light beam; and
an anamorphic lens operable to shape an elliptical light beam substantially collimated by the collimator lens to give the light beam a substantially circular shape.

\* \* \* \* \*